Oct. 16, 1956

E. W. JACOBSON 2,766,733

NUTATING DISC METER FOR CORROSIVE AND ABRASIVE
SOLID LADEN LIQUID

Filed July 31, 1953

INVENTOR.
Eugene W. Jacobson.
BY
Horace Cooke
ATTORNEY.

Oct. 16, 1956    E. W. JACOBSON    2,766,733
NUTATING DISC METER FOR CORROSIVE AND ABRASIVE
SOLID LADEN LIQUID
Filed July 31, 1953            2 Sheets-Sheet 2
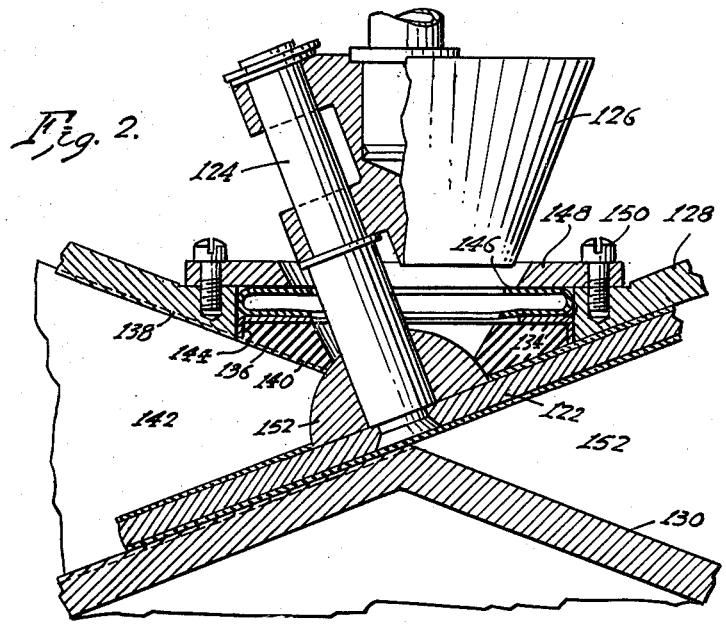
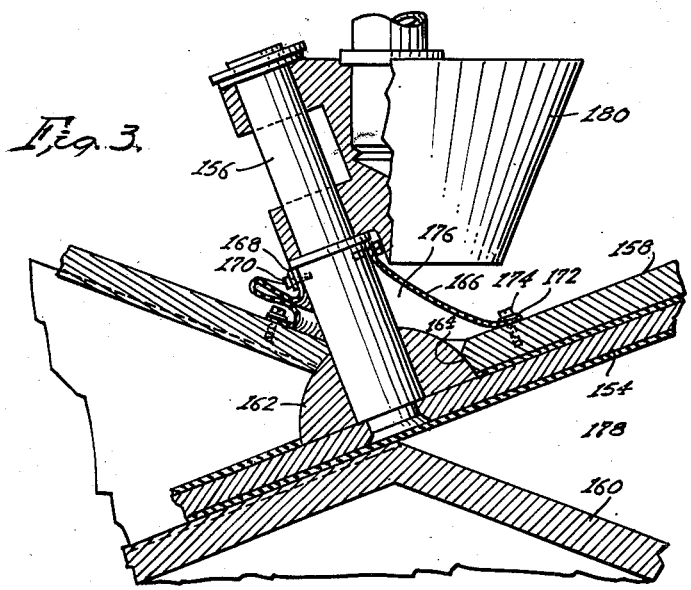
INVENTOR.
Eugene W. Jacobson.
BY
Horace S. Cooke
ATTORNEY.

United States Patent Office 2,766,733
Patented Oct. 16, 1956

2,766,733

NUTATING DISC METER FOR CORROSIVE AND ABRASIVE SOLID LADEN LIQUID

Eugene W. Jacobson, Oakmont, Pa., assignor to Gulf Research & Development Company, Pittsburgh, Pa., a corporation of Delaware Application July 31, 1953, Serial No. 371,620

12 Claims. (Cl. 121—69)

This invention relates to nutating disc meters and more specifically pertains to mounting means for the disc and sealing means for such mounting means.

Nutating disc meters are widely employed for metering water from public sources of supply, and for such use are generally satisfactory with respect to accuracy and long life. However, it has been found that utilization of conventional nutating disc meters for metering thixotropic and corrosive fluids, especially such fluids that contain suspended abrasive solids, is not satisfactory. Exemplary of such thixotropic fluids containing suspended abrasive solids are the drilling muds used in conjunction with rotary well drilling equipment.

In conventional nutating disc meters, all or a large portion of the relatively movable surfaces that support and prescribe the freedom of movement of the disc are exposed to the fluid being metered. Accordingly, such meters, when employed for metering corrosive fluids or fluids containing suspended abrasive solids, are subjected to accelerated wear and may be rendered entirely inoperative in a short period of time.

Broadly, the present invention comprises a nutating disc meter in which the disc is supported and its movement prescribed by means that are sealed against being contacted by the fluid being metered. In addition, a pressure equalizating system is provided to facilitate the effectiveness of the seal against the metered fluid.

The invention is shown in detail in the accompanying drawings, wherein:

Figure 2 is an enlarged central vertical sectional detailed view of a modified sealing means; and, Figure 3, like Figure 2, is an enlarged, central vertical sectional, detail view of a still further modification of the sealing means.

Figure 1:
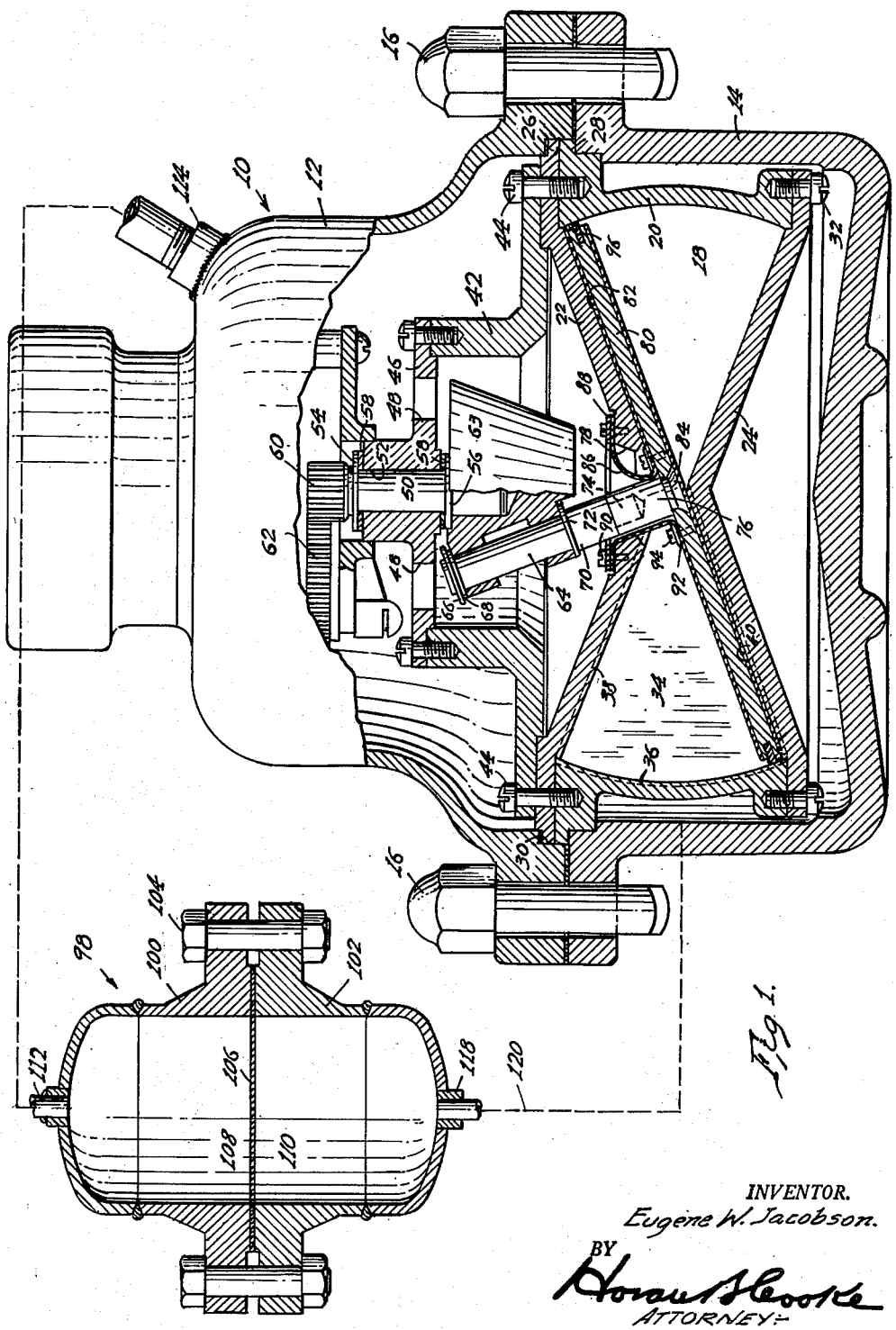
Figure 1 is a side elevational view with portions thereof being shown in section, and with portions of the pressure equalizing system being indicated diagrammatically.

Referring to Figure 1 there is designated generally at 10 a nutating disc meter comprising a sectional housing formed of upper and lower sections 12 and 14 secured by bolts 16.

Within the lower section 14 of the housing a disc chamber 18 is defined by a meter body wall 20 and opposed cones 22 and 24 disposed at the top and the bottom of the meter body wall 20, respectively. The meter body wall 20 and the upper cone 22 are provided with radially extending flanges 26 and 28, respectively, at their juncture, and are received in a recess 30 provided in the upper section 12 of the housing so as to be clamped securely between the sections 12 and 14 of the housing. The lower cone 24 is secured to the meter body wall 20 by screws 32 spaced about the periphery, thereof.

A vertical partition 34 is disposed in the disc chamber 18 and is seated in complementary grooves 36, 38, and 40 provided in the meter body wall 20 and the upper and lower cones 22 and 24, respectively.

A cage 42 is positioned above the upper cone 22, and is secured to the upper cone 22 and the meter body wall 20 by means of screws 44 spaced about the periphery thereof. A cage cover 46 is fastened to the top of the cage 42 by means of screws 48, and the cage 46 is provided with apertures 48 which afford fluid communication between the interior of the upper section 12 of the housing and the space between cage 42 and the upper cone 22.

A vertical yoke shaft 50 is journaled through a central opening 52 that extends through the cage cover 46. The yoke shaft 50 is retained in position by retaining rings 54 and 56 with spacer washers 58 being interposed between the retainer rings 54 and 56 and the opposite sides of the cage cover 46.

A gear 60 is mounted on the upper end of the yoke shaft 50 and engages the register gear train, only partially shown and indicated at 62. The register gear train and meter indicating apparatus disposed within the upper section 12 of the housing is entirely conventional and well-known and is therefore neither illustrated nor described.

A yoke 63 is secured to the lower end of the yoke shaft 50 and a nutating shaft 64 is journaled therethrough. The nutating shaft 64 is restrained against longitudinal movement by a retaining ring 66 and a spacer washer 68 at its upper end. The portion of the nutating shaft 64 that is journaled through the yoke 63 is of reduced size so as to define a shoulder 70, and a spacer washer 72 is interposed between the shoulder 70 and the yoke 63.

The lower end of the shaft 64 terminates in a threaded extremity 74 of reduced size, such threaded extremity 74 being removably threaded into an extension 76 of the shaft 64.

The cone 22 is provided with a central opening 78 through which the extension 76 of the shaft 64 projects. A disc 80, having relatively soft deformable upper and lower elastic surface layers 82, is disposed within the disc chamber 18. The relatively soft layers 82 on the disc 80 can conveniently consist of layers of soft natural rubber or hydrocarbon-resistant synthetic rubber. The disc 80 is centrally secured to the extension 76 of the shaft 64 by means of the extension 76 extending through a central opening in the disc 80. The portion 84 of the extension 76 that extends through the disc 80 is of reduced size and has an expanded extremity, as shown, so that the disc 80 is securely retained thereon.

As inconventional disc meters, the disc 80 is provided with a radial slot therethrough, not shown, through which the partition 34 is received.

In order to prevent the passage of fluids from the disc chamber 18 through the opening 78 and into the space overlying the upper cone 22, a flexible, preferably elastic sleeve 86, is provided. The sleeve 86 surrounds the extension 76 of the shaft 64 and extends through the opening 78 in the upper cone 22 with the upper and lower extremities of the sleeve 86 being secured to the upper cone 22 and the disc 80, respectively. The upper end portion of the sleeve 86 is flared outwardly to overlie the upper cone 22 and is retained thereon by means of a securing ring 88 and screw fasteners 90 that extend through the securing ring 88 and the sleeve 86 into the upper cone 22. The lower end portion of the sleeve 86 is secured to the disc 80 in analogous manner, the lower end portion of the sleeve 86 being outwardly flared to overlie the disc 80 and is secured thereto by means of a securing ring 92 placed thereon and screw fasteners 94 extending through the securing ring 92 and the sleeve 86 into the disc 80. It is preferred that the upper soft layer 82 on the disc 80 cover only the portion of the surfaces of the disc 80 lying radially outward of the securing ring 92. Although not so illustrated, the lower end portion of the sleeve 86, the securing ring 92, and the screw fasteners 94 can be countersunk into the disc 80 and covered by the upper surface layer 82, so that a substantially smooth over-all upper surface for the disc 80 is provided.

In order that a more effective fluid seal may be obtained between the periphery of the disc 80 and the meter body wall 20, the preferred construction also embodies the periphery of the disc 80 being provided with a groove in which is received a sealing ring 96.

The sealing ring 96 projects radially a short distance outward from the body of the disc 80 (somewhat exaggerated in the drawings) and is adapted to make a sliding and sealing contact with the inner surfaces of the meter body wall 20. The sealing ring 96 is relatively thin as compared to the total thickness of the disc 80 and its surfaces layers 82 so that the area of contact between the sealing ring 96 and the meter body wall 20 is minimized, whereby a more efficient wiping action of the meter body wall 20 by the sealing ring 96 is obtained. The sealing ring 96 can be fashioned from such materials as natural rubber or hydrocarbon-resistant synthetic rubber.

As thus far described, it will be seen that the structure provided for supporting and prescribing of the freedom of movement of the disc 80 namely, the shaft 50, the yoke 63 and shaft 64 are disposed externally of the disc chamber 18 and are completely sealed therefrom by means of the sleeve 86. Accordingly, such elements are free from the deleterious effects that may be wrought by the fluid being metered. For example, in the metering of drilling muds the suspended abrasive solids contained therein do not contact the mounting means and therefore cannot cause wear or freezing of the same.

In the use of the meter, the upper section 12 of the meter housing is filled with a light lubricating oil, and such oil also fills the space overlying the upper cone 22 by virtue of the apertures 48 provided in the cage cover 46 whereby the mounting means for the disc 80 are continuously surrounded and lubricated by such oil, it being noted that such oil is prevented from entering the disc chamber 18 by the sleeve 86. In this connection, the sleeve 86 is preferably made from a material whose strength and durability is not adversely affected by hydrocarbons, such as well-known hydrocarbon-resistant synthetic rubbers. Fabrication of the sleeve from such materials resists the action of the lubricating oil in contact therewith and is also of value when the fluid being metered contains hydrocarbons such as the oil-emulsion drilling muds.

In order to prevent undue distortion of the sleeve 86 by fluid pressure differentials existing between disc chamber 18 and the space or chamber overlying the upper cone 22, a pressure equalizing system is employed. Such pressure equalizing system comprises a pressure equalizing vessel 98 formed of upper and lower sections 100 and 102 secured together at their marginal flanges with bolts 104. A movable wall or flexible diaphragm 106 is interposed and held between the upper and lower sections 100 and 102 of the vessel 98 so as to divide the interior thereof into upper and lower compartments or chambers 108 and 110. As in the case of the sleeve 86, the diaphragm 106 is preferably fashioned of a hydrocarbon-resistant synthetic rubber.

Fluid communication is afforded between the chamber 108 and the interior of the upper section 12 of the meter housing by means of pipe fittings 112 and 114 on the upper section 100 of the vessel 98 and the upper section 12 of the meter housing, respectively, with piping 116 (indicated diagrammatically) connecting the pipe fittings 112 and 114. The chamber 108 and the piping 116 are for containing oil in communication with the oil contained with the upper section 12 of the meter housing.

The lower chamber 110 of the pressure equalizing vessel 98 communicates with the inlet, not shown, of the meter 10. Such communication is afforded by a pipe fitting 118 on the lower section 102 of the pressure equalizing vessel 98 and associated piping 120 for appropriate connection with the inlet of the meter 10.

The operation of nutating disc type meters is well-known and a detailed description of such operation is not believed necessary, except insofar as conventional operation is modified by the principles of this invention.

As hereinbefore explained, the mounting means for the disc 80 support and prescribe the freedom of movement of the disc 80, and such mounting means are completely sealed against contact by the metered fluid. The hereinbefore described pressure equalizing system prevents undesirable distortion of the sleeve 86 by virtue of the fluid pressure existing within the inlet of the meter being communicated through the piping 120, chamber 110, diaphragm 106, chamber 108 and piping 116 to the oil contained within the upper section 12 of the housing above the upper cone 22. It will be understood that the chamber 110 and its associated piping 120 are filled with the fluid being metered. With such an arrangement, the fluid pressure within the disc chamber 18 will be substantially equal to the oil pressure within the housing section 12, neglecting minor differences in the hydrostatic pressures due to differences in density between the oil and the fluid being metered. Such pressure equalization prevents undue hydraulic distortion of the sleeve 86 and minimizes any tendency for fluids to leak pass the sleeve 86.

The soft and yielding character of the layers 82 on the disc 80, the flexibility of the sleeve 86 and the wiping action afforded by the sealing ring 96 on the disc 80 all cooperate to facilitate the passage, without jamming, of fluids through the disc chamber 18, although such fluids may contain substantial amounts of suspended solids. In addition, the mounting means for the disc 80 are entirely protected against corrosion or abrasion by the fluid being metered.

Attention is now directed to the modified sealing means disclosed in Figure 2. As in the previously described form of the invention, a disc 122 is secured to a nutating shaft 124 journaled in a yoke 126, and disposed between upper and lower cones 128 and 130, respectively. However, in this form of the invention an annular seat 132 is suitably mounted on the shaft 124 at the juncture of such shaft with the disc 122, such annular seat 132 having a spherical surface. The upper cone 128 is provided with a central opening 134 in which an annular seal 136 is moveably disposed for sealing engagement with the spherical surface of the seat 132. The seal 136 is tapered, as shown, so as to present a relatively low area of contact with the seat 132, whereby an effective sealing action and wiping action is obtained. It will also be noted that the lower surface of the seal 136 constitutes a continuation of the lower surface of the upper cone 128, and that both the upper cone 128 and the seal 136 are provided with complementary grooves 138 and 140 for receiving the upper edge of the partition 142.

The seal 136 is provided with a seal housing 144 that has a sliding fit in the opening 134. The seal 136 is yieldingly urged into sealing engagement with the seat 132 by means of a spring bellows 146 compressed between the seal housing 144 and a retaining ring 148. The retaining ring 148 is detachably secured to the upper cone 128 by means of a plurality of circumferentially spaced screw fasteners 150. The spring bellows 146 is fabricated from a resilient metal such as an alloy of copper and beryllium and contacts the seal housing 144 and the retaining ring 148 in such a manner as to provide fluid tight contacts.

The seal 136 can conveniently be fabricated from carbon, Bakelite or other suitable material. It is preferred that the seal 136 be formed of sufficiently hard or durable material so as to withstand sliding contact with the seat 132, and by wiping action remove any solid particles that may tend to adhere to the surface of the seat 132.

In this form of the invention it will be evident that the contact of the seal 136 with the seat 132 and the contact of the spring bellows 146 with the seal housing 144 and retaining ring 148 prevents fluid communication between the disc chamber 152 and the space overlying the upper cone 128. The resilience of the spring bellows 146 compensates for wear occurring to the seat 132 and the seal 136, and the pressure equalizing system, used in conjunction with each form of the invention and already described in connection with the form of the invention shown in Figure 1, facilitates the effectiveness of the seal between the seal 136 and the seat 132 by preventing any substantial pressure differential thereacross.

Turning now to the modified form of the invention illustrated in Figure 3, which illustrates still a different seal construction, there is provided a nutating disc 154 secured to a nutating shaft 156 and positioned between upper and lower cones 158 and 160, respectively. In this form of the invention a seat 162 is secured to the shaft 156 at the juncture of the shaft 156 and the disc 154, such seat 162 being provided with a spherical surface. The upper cone 158 is provided with a central opening 164 which receives and affords a sliding contact for the cone 158 with the spherical surface of the seat 162. The opening 164 is of a configuration having a minimum diameter intermediate its length through the cone 158, as shown, which configuration is adapted not only to accommodate the shaft 156, but which also affords a minimum area of contact between the cone 158 and the seat 162. Such minimum area of contact permits the application of increased pressure through such area of contact without an undue frictional drag, thereby promoting the efficiency of the wiping action of the cone 158 on the surface of seat 162.

A flexible and preferably resilient boot or sleeve 166 is provided for a seal. Sleeve 166, preferably fashioned of similar materials as the previously described sleeve 86 of Figure 1, embraces the shaft 156 above the upper cone 158 and is secured at its upper and lower extremities to the shaft 156 and the upper surface of the cone 158, respectively. The upper extremity of the sleeve 166 is secured to the shaft 156 by means of a securing ring 168 and screw fasteners 170. The lower extremity of the sleeve 166 is outwardly flared to overlie the cone 158 and is secured thereto by means of a securing ring 172 and screw fasteners 174.

The operation of the form of the invention shown in Figure 3 is analogous to the operation of the previously described form of the invention, however, in this instance the annular space 176 intermediate the shaft 156 and the sleeve 166 is filled with the same oil as that used to fill the upper portion of the housing. The sleeve 166 positively prevents fluids within the disc chamber 178 from passing into the space occupied by the yoke 180 and related mechanism, while the pressure equalizing system operates through the agency of the sleeve 166 to maintain substantially equal fluid pressures within the annular space 176 and the disc chamber 178. Such pressure equalization facilitates the effectiveness of the seal between the seat 162 and the cone 158 for preventing the passage of fluids from the disc chamber 178 through the opening 164 in the cone 158.

The subject invention has been described in considerable detail for the purpose of conveying a full and complete understanding thereof, and such detailed description should not be considered as inferring a limited scope to the invention. Rather, reference should be made to the appended claims for ascertainment of the scope of the invention.

I claim:

1. In a nutating disc meter, a housing and means defining a disc chamber and a second chamber therein, said means including a cone separating and preventing fluid communication between said chambers, a nutating disc in the disc chamber, said cone having a central opening therethrough, a nutating shaft secured to the disc and extending into the second chamber through said opening, means disposed within the second chamber for supporting the shaft and the disc secured thereto, sealing means for preventing fluid communication between the chambers, and means for substantially equalizing the pressures in the chambers.

2. In a nutating disc meter, a housing and means defining a disc chamber and a second chamber therein, said means including a cone separating and preventing fluid communication between said chambers, a nutating disc in the disc chamber, said cone having a central opening therethrough, a nutating shaft secured to the disc and extending into the second chamber through said opening, means disposed within the second chamber for supporting the shaft and the disc secured thereto, sealing means for preventing fluid communication between the chambers, and means for substantially equalizing the pressures within the chambers, said last means comprising a vessel having first and second compartments therein that communicate with the disc and second chambers respectively, said compartments being separated by a movable wall.

3. In a nutating disc meter, a housing and means defining a disc chamber and a second chamber therein, said means including a cone separating and preventing fluid communication between said chambers, a nutating disc disposed in the disc chamber, said cone having a central opening, a nutating shaft secured to the disc and extending through the opening into the second chamber, sealing means for preventing fluid communication through the opening, and means for substantially equalizing the pressures in said chambers.

4. In a nutating disc meter, a housing and means defining a disc chamber and a second chamber therein, said means including a cone separating said chambers, a shaft disposed in said second chamber in axial alignment with the cone, means rotatably supporting the shaft and limiting endwise movement thereof, a yoke carried by said shaft, a nutating disc in said disc chamber, said cone having a central opening therethrough, a nutating shaft secured to the disc and projecting into said second chamber through said opening, means journaling the nutating shaft in the yoke and preventing endwise movement of such shaft with respect to the yoke, and sealing means for preventing fluid communication between the chambers.

5. The combination of claim 3, wherein said sealing means includes a seat having a spherical surface positioned at the juncture of the shaft and the disc, an annular seal, and elastic means urging the seal into engagement with the seat.

6. The combination of claim 5, wherein said elastic means comprises a securing ring carried by the cone, and a spring bellows interposed between the ring and the seal.

7. In a nutating disc meter, a cone having a central opening therethrough, a shaft in axial alignment with the cone, means carried by the cone rotatably supporting the shaft and limiting endwise movement thereof, a yoke carried by the shaft, a further shaft and means journaling such shaft in the yoke and preventing endwise movement thereof, said further shaft extending into the opening of the cone and having an axis inclined to the axis of the first mentioned shaft.

8. The combination of claim 7, including a nutating disc on said further shaft, a seat having a spherical surface positioned at the juncture of said further shaft and the disc, an annular seal, and means for effecting a fluid-tight connection between the cone and the seal and also for yieldingly urging the seal into sealing engagement with the seat.

9. In a nutating disc meter, a pair of opposed first and second cones, said first cone having an opening therethrough at its apex, said second cone terminating at its apex, a disc positioned between the cones and contacting the apex of the second cone, a nutating shaft secured to the disc and extending through the opening in the first cone, a further shaft aligned with the axis of the cones and a yoke carried thereby, means for journaling the nutating shaft in the yoke and for preventing endwise movement of the nutating shaft, and means for preventing fluid communication through the opening in the first cone.

10. In a nutating disc meter, a housing and means defining a disc chamber and a second chamber therein, said means including a cone separating said chambers, a nutating disc in the disc chamber, said cone having a central opening therethrough, a nutating shaft secured to the disc and extending into the second chamber through said opening, and sealing means for preventing fluid communication between the chambers, said last means including a flexible sleeve surrounding the shaft and having one end in the second chamber and secured to the cone, the other end of said sleeve being secured to the shaft.

11. In a nutating disc meter, a housing and means defining a disc chamber and a second chamber therein, said means including a cone separating said chambers, a nutating disc and the disc chamber, said cone having a central opening therethrough, a nutating shaft secured to the disc and extending into the second chamber through said opening, and sealing means for preventing fluid communication between the chambers, said last means including a flexible sleeve surrounding the shaft and having one end in the second chamber and secured to the cone, said sleeve extending through the opening and having its other end secured to the disc.

12. In a nutating disc meter, a housing and means defining a disc chamber and a second chamber therein, said means including a cone separating said chambers, a nutating disc in the disc chamber, said cone having a central opening therethrough, a nutating shaft secured to the disc and extending into the second chamber through said opening, sealing means for preventing fluid communication between the chambers, said last means including a flexible sleeve surrounding the shaft and having one end in the second chamber and secured to the cone, and means for substantially equalizing the pressure between the chambers.

References Cited in the file of this patent
UNITED STATES PATENTS

| Number | Name | Date |
|---|---|---|
| 583,474 | Hogan | June 1, 1897 |
| 1,495,010 | Ford | May 20, 1924 |
| 1,807,139 | Volodimirov | May 26, 1931 |
| 2,107,090 | Swennes | Feb. 1, 1938 |
| 2,174,306 | Bassett | Sept. 26, 1939 |
| 2,324,701 | Herman | July 20, 1943 |